(12) United States Patent
Ishida

(10) Patent No.: US 12,168,625 B2
(45) Date of Patent: Dec. 17, 2024

(54) METHOD FOR MANUFACTURING OPTICAL FIBER

(71) Applicant: Fujikura Ltd., Tokyo (JP)

(72) Inventor: Itaru Ishida, Suzuka (JP)

(73) Assignee: Fujikura Ltd., Tokyo (JP)

( * ) Notice: Subject to any disclaimer, the term of this patent is extended or adjusted under 35 U.S.C. 154(b) by 518 days.

(21) Appl. No.: 17/602,429

(22) PCT Filed: May 7, 2020

(86) PCT No.: PCT/JP2020/018538
§ 371 (c)(1),
(2) Date: Oct. 8, 2021

(87) PCT Pub. No.: WO2021/019864
PCT Pub. Date: Feb. 4, 2021

(65) Prior Publication Data
US 2022/0185721 A1    Jun. 16, 2022

(30) Foreign Application Priority Data

Jul. 31, 2019  (JP) .................................. 2019-141326

(51) Int. Cl.
*C03B 37/025* (2006.01)
*C03B 37/027* (2006.01)
(Continued)

(52) U.S. Cl.
CPC ........ *C03B 37/0253* (2013.01); *C03B 37/027* (2013.01); *C03B 37/032* (2013.01); *C03C 25/105* (2013.01)

(58) Field of Classification Search
CPC .................................................. C03B 37/0253
See application file for complete search history.

(56) References Cited

U.S. PATENT DOCUMENTS 6,002,472 A * 12/1999 Naka ........................ G01L 5/042
356/73.1
10,016,951 B2   7/2018 Okada
(Continued)

FOREIGN PATENT DOCUMENTS

JP    2011-505326 A    2/2011
JP    2012-051757 A    3/2012
(Continued)

OTHER PUBLICATIONS

International Search Report issued in corresponding International Application No. PCT/JP2020/018538, mailed on Aug. 11, 2020 (2 pages).

*Primary Examiner* — Cynthia Szewczyk
(74) *Attorney, Agent, or Firm* — Osha Bergman Watanabe & Burton LLP

(57) ABSTRACT

A method for manufacturing an optical fiber includes: gripping a preform by a gripper that includes an aligner; forming a bare fiber by melting the preform in a melting furnace; cooling the bare fiber by blowing gas in a cooler; applying a resin and coating an outer circumference of the bare fiber; curing the resin; acquiring input information that changes a flow rate of the gas blown to the bare fiber in the cooler; and adjusting based on the input information an entry position of the bare fiber into the cooler by controlling the aligner and moving the preform.

9 Claims, 4 Drawing Sheets

(51) Int. Cl.
      *C03B 37/03*      (2006.01)
      *C03C 25/105*    (2018.01)

(56) References Cited

U.S. PATENT DOCUMENTS

| | | | | |
|---|---|---|---|---|
| 2005/0126227 A1* | 6/2005 | Collaro | ................. | G01M 11/37 |
| | | | | 65/486 |
| 2013/0327097 A1* | 12/2013 | Abe | ................. | C03B 37/02772 |
| | | | | 65/435 |
| 2020/0048138 A1* | 2/2020 | Ishida | ................... | C03C 25/106 |

FOREIGN PATENT DOCUMENTS

| | | | | |
|---|---|---|---|---|
| JP | 5851636 B1 | 2/2016 | | |
| JP | 6457580 B2 | 1/2019 | | |
| WO | 2014/208382 A1 | 12/2014 | | |
| WO | 2017/038396 A1 | 3/2017 | | |
| WO | WO-2018189987 A1 * | 10/2018 | ........... | C03B 37/025 |

* cited by examiner

METHOD FOR MANUFACTURING OPTICAL FIBER

CROSS-REFERENCE TO RELATED APPLICATIONS

This application claims priority to Japanese Patent Application No. 2019-141326 filed on Jul. 31, 2019. The entire content of this application is incorporated herein by reference.

TECHNICAL FIELD

The present invention relates to a method for manufacturing an optical fiber.

BACKGROUND

Patent Document 1 discloses a method for manufacturing an optical fiber using a non-contact direction changer. In this method for manufacturing an optical fiber, the coating state is stabilized by adjusting the temperature of a bare fiber by a temperature adjusting unit provided between a non-contact direction changer and a coating unit.

PATENT LITERATURE

Patent Document 1

Japanese Patent No. 6457580

Depending on the size of the building that houses the manufacturing apparatus and the layout of the manufacturing apparatus, it may not be possible to secure a space for disposing the temperature adjusting unit as disclosed in Patent Document 1. Further, even when the temperature adjusting unit can be disposed, it may be possible to open up technology options to stabilize the state of the coating in case of the state of the coating is stabilized by other means.

Therefore, the inventors of the present application have studied carefully and found that the state of the coating can be stabilized even by devising the position for gripping the preform.

One or more embodiments of the present invention provide a method for manufacturing an optical fiber in which a state of coating can be stabilized by devising a position for gripping a preform.

SUMMARY

The method for manufacturing an optical fiber according to one or more embodiments of the present invention includes: gripping a preform by a grip unit (i.e., gripper) that includes an alignment mechanism (i.e., aligner); forming a bare fiber by melting the preform in a melting furnace; cooling the bare fiber by blowing gas in a cooling unit (i.e., cooler); applying a resin to be a coating to an outer circumference of the bare fiber; curing the resin; acquiring a factor that changes a flow rate of the gas blown to the bare fiber by the cooling unit, as input information; and adjusting an entry position of the bare fiber into the cooling unit, by controlling an alignment mechanism and moving the preform, based on the input information.

According to one or more embodiments of the present invention, it is possible to adjust the entry position of the bare fiber with respect to the cooling unit while suppressing the change in the flow rate of the gas. Therefore, the temperature change of the bare fiber due to the change in the flow rate of the gas in the cooling unit is suppressed, and it is possible to stabilize the state of the coating.

DETAILED DESCRIPTION

First Embodiment

Hereinafter, an optical fiber manufacturing method of a first embodiment will be described with reference to the drawings.

Figure 1:
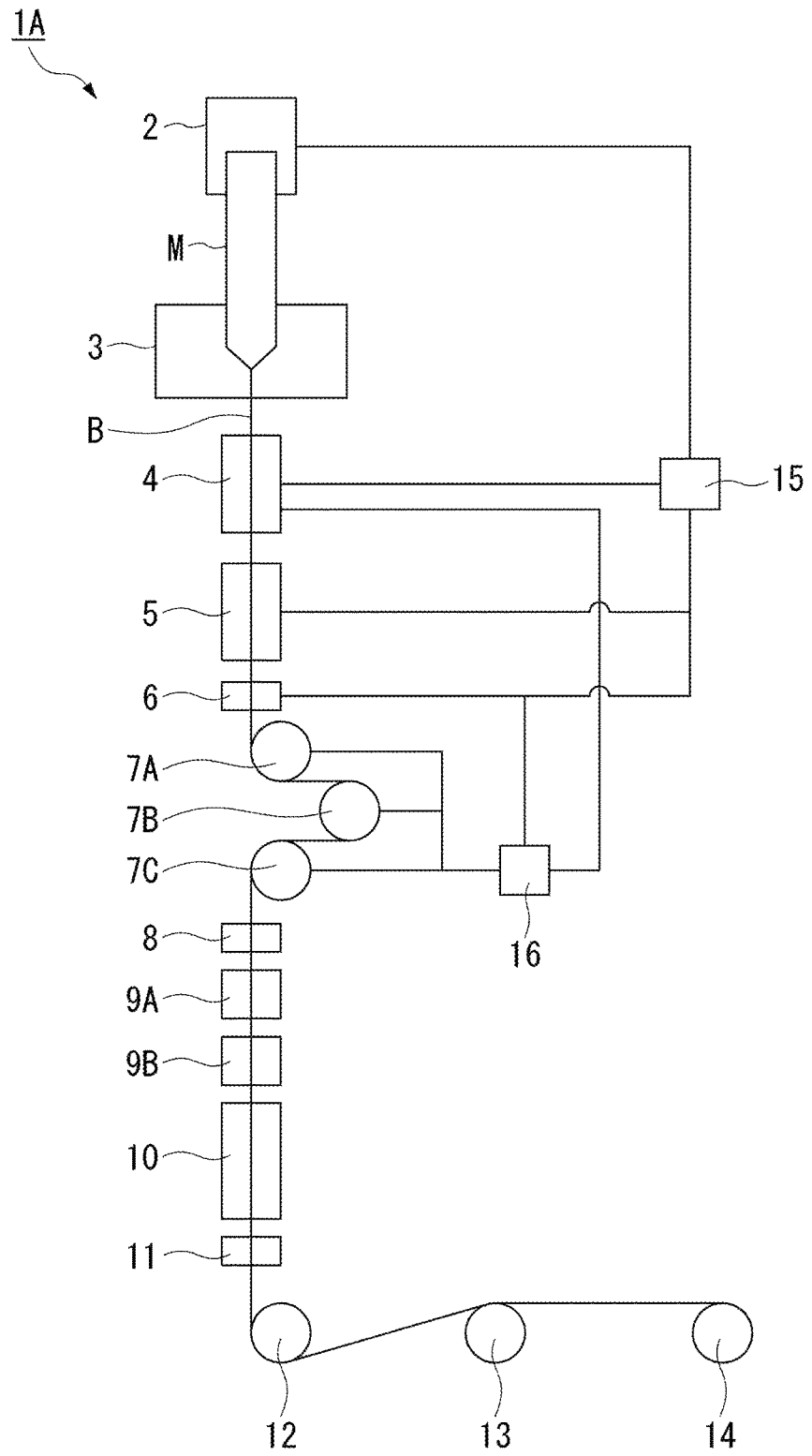
FIG. 1 is a diagram showing a schematic configuration of an optical fiber manufacturing apparatus according to a first embodiment.

As shown in FIG. 1, the optical fiber manufacturing apparatus (hereinafter, referred to as manufacturing apparatus 1A) in one or more embodiments includes a grip unit 2, a melting furnace 3, a fiber diameter measuring unit 4 (i.e., fiber diameter measure), a bubble detection unit 5 (i.e., bubble detector), a position detection unit 6 (i.e., position detector), a plurality of non-contact direction changers 7A to 7C, a pre-coating position detection unit 8, coating units 9A and 9B, a coating curing device 10, a coating diameter measuring device 11, a direction changer 12, a take-up unit 13, a winding unit 14, a control unit 15, and a gas amount adjusting unit 16.

(Direction Definition)

In one or more embodiments, the grip unit 2 side in the path line is referred to as the upstream side, and the winding unit 14 side is referred to as the downstream side. Further, a plane orthogonal to the longitudinal direction of the preform M when the preform M is set in an ideal state (a state not inclined with respect to the path line) is referred to as an orthogonal plane. In FIG. 1, the preform M extends in the vertical direction. Therefore, the longitudinal direction substantially coincides with the vertical direction, and the orthogonal plane substantially coincides with the horizontal plane. However, the longitudinal direction of the preform M may be appropriately changed, and may be, for example, the horizontal direction.

The grip unit 2 grips the preform M and feeds it into the melting furnace 3. Further, the grip unit 2 is provided with an alignment mechanism, and is capable of adjusting the position of the preform M on the orthogonal plane. The melting furnace 3 heats and melts the preform M by a heater to form a bare fiber B. The fiber diameter measuring unit 4 measures the outer diameter of the bare fiber B. The bubble detection unit 5 detects whether or not there are bubbles inside the bare fiber B. The position detection unit 6 detects the entry position of the bare fiber B into the non-contact direction changer 7A located on the most upstream side, among the plurality of non-contact direction changers 7A to 7C.

The fiber diameter measuring unit 4, the bubble detection unit 5, and the position detection unit 6 are disposed on the downstream side of the melting furnace 3 and on the upstream side of the non-contact direction changers 7A to 7C. The order of arrangement of the fiber diameter measuring unit 4, the bubble detection unit 5, and the position detection unit 6 may be appropriately changed. However, the position detection unit 6 may be disposed at a position as close as possible to the non-contact direction changer 7A.

The non-contact direction changers 7A to 7C change the traveling direction of the bare fiber B by 90°, 180°, and 90°, respectively. For example, the non-contact direction changer 7A changes the traveling direction of the bare fiber B from the downward direction to the horizontal direction by about 90°. The number, position, direction changing angle, and the like of these non-contact direction changers may be changed as appropriate.

The non-contact direction changers 7A to 7C each have a guide groove for guiding the bare fiber B. An outlet for a fluid (gas) that floats the bare fiber B wound along the guide groove is formed in the guide groove. The non-contact direction changers 7A to 7C can float the bare fiber B by blowing gas such as air or He from the outlet to the bare fiber B, such that its constituent members are not be in contact with the bare fiber B. Further, since the bare fiber B can be cooled by blowing gas, the non-contact direction changers 7A to 7C are also cooling units. Since the configuration of the non-contact direction changer in one or more embodiments is the same as that described in Japanese Patent No. 5851636, a detailed description thereof will be omitted. The configuration of the non-contact direction changer is not limited to this, and the configuration may be appropriately changed as long as the bare fiber B is floated by blowing gas and the direction of the bare fiber B is changed.

The pre-coating position detection unit 8 is located on the downstream side of the plurality of non-contact direction changers 7A to 7C and on the upstream side of the coating units 9A and 9B. The pre-coating position detection unit 8 detects the position of the bare fiber B entering the coating unit 9A.

The coating units 9A and 9B coat the outer periphery of the bare fiber B with a fluid material containing a resin precursor (hereinafter, simply referred to as a resin material) by die coating or the like to form an uncured coating layer. The uncured coating layer may be a single layer or a plurality of layers. As the resin material, for example, an ultraviolet curable resin such as a urethane acrylate resin may be used.

In the example of FIG. 1, the resin material for the primary layer is applied by the coating unit 9A on the upstream side, and the resin material for the secondary layer is applied by the coating unit 9B on the downstream side. The configuration of the coating units may be changed as appropriate. For example, the resins of both the primary layer and the secondary layer may be applied by one coating unit. Further, a third coating unit for applying the resin material to be the colored layer may be provided on the downstream side of the coating unit 9B. Alternatively, the coating unit 9A may be used to apply the resin material to be the primary layer and the secondary layer, and the coating unit 9B may be used to apply the resin material to be the colored layer. The primary layer, secondary layer, and colored layer described above are all included in the "coating layer".

The coating curing device 10 cures the uncured coating layer. In the present specification, the coating layer after curing is simply referred to as coating. Further, the coating and the bare fiber B are collectively referred to as an optical fiber. When the resin material is an ultraviolet curable resin, an ultraviolet irradiation lamp or UV-LED, a combination thereof, or the like may be used as the coating curing device 10.

The arrangements and configurations of the coating units 9A and 9B and the coating curing device 10 may be appropriately changed according to the required characteristics of the optical fiber (for example, the degree of curing of each resin material), the drawing speed of the manufacturing apparatus 1A, and the like. For example, separate coating curing devices 10 may be disposed on the downstream side of the coating unit of the primary layer, the downstream side of the coating unit of the secondary layer, and the downstream side of the coating unit of the colored layer, respectively. Further, the number of coating curing devices 10 may be increased so as to sufficiently cure the resin material when the drawing speed is high.

The coating diameter measuring device 11 is located on the downstream side of the coating curing device 10. The coating diameter measuring device 11 measures the outer diameter of the coating.

The direction changer 12 changes the direction of the optical fiber toward the take-up unit 13. As the direction changer 12, the above-described non-contact direction changer may be used, or a general pulley or the like may be used. Further, the direction changer 12 may not be provided.

The take-up unit 13 is, for example, a take-up capstan. The take-up unit 13 determines the drawing speed in the manufacturing apparatus 1A. The winding unit 14 is provided with a bobbin and a winding device for rotating the bobbin. When the winding device rotates the bobbin, the optical fiber is wound around the bobbin, and the bobbin-wound optical fiber is obtained. A dancer unit may be provided between the take-up unit 13 and the winding unit 14. By correcting the difference between the take-up speed of the take-up unit 13 and the winding speed of the bobbin by the dancer unit, it is possible to suppress the occurrence of slack in the optical fiber between the take-up unit 13 and the winding unit 14.

The control unit 15 is connected to the grip unit 2, the fiber diameter measuring unit 4, the bubble detection unit 5, and the position detection unit 6 by wire or wirelessly. Although details will be described later, the control unit 15 controls the alignment mechanism of the grip unit 2 and adjusts the position of the preform M, based on the detection results of the fiber diameter measuring unit 4, the bubble detection unit 5, and the position detection unit 6. As the control unit 15, an integrated circuit such as a microcontroller, an integrated circuit (IC), a large-scale integrated circuit (LSI), and an application specific integrated circuit (ASIC), a numerical control (NC) device, or the like may be used. When an NC device or the like is used as the control unit 15, machine learning may be used or may not be used.

The fiber diameter measuring unit 4 is connected to the gas amount adjusting unit 16 by wire or wirelessly. Further, the fiber diameter measuring unit 4 inputs the measurement result of the outer diameter of the bare fiber B to the gas amount adjusting unit 16. The gas amount adjusting unit 16 adjusts the flow rate of the gas blown to the bare fiber B in the non-contact direction changers 7A to 7C, based on the measurement result of the outer diameter of the bare fiber B.

Here, the temperature of the bare fiber B when the bare fiber B enters the coating units 9A and 9B may be constant. This is because when the temperature of the bare fiber B changes, the state of the coating becomes unstable. For example, the amount of resin adhering to the bare fiber B changes depending on the temperature of the bare fiber B, resulting in a change in the coating diameter. Further, when the temperature of the bare fiber B deviates from an appropriate range, the resin material to be applied for coating may not be applied normally, or the adhesion between the coating and the bare fiber B may decrease.

On the other hand, examples of a direct factor for changing the temperature of the bare fiber B entering the coating units 9A and 9B include a fluctuation of the flow rate of the gas in the non-contact direction changers 7A to 7C. Examples of factors that cause the flow rate of the gas to fluctuate include (1) Change in outer diameter of bare fiber B, (2) Change in tension of bare fiber B, and (3) Change in the entry position of the bare fiber B into the non-contact direction changer 7A. That is, (1) to (3) are indirect factors that change the temperature of the bare fiber B. Hereinafter, the factors (1) to (3) will be described in more detail.

(1) Change in Outer Diameter of Bare Fiber B

Normally, the feed speed of the preform M to the melting furnace 3 by the grip unit 2 and the drawing speed by the take-up unit 13 are adjusted such that the change in the outer diameter of the bare fiber B is within a predetermined range (for example, within ±0.5 µm). However, for example, when air bubbles are contained in the bare fiber B, or when the feed speed or the drawing speed cannot be adjusted in time, the outer diameter of the bare fiber B may change beyond a predetermined range.

When the outer diameter of the bare fiber B becomes large, the force received from the gas in the non-contact direction changers 7A to 7C becomes large, and the floating amount of the bare fiber B increases. On the contrary, when the outer diameter of the bare fiber becomes small, the floating amount of the bare fiber B in the non-contact direction changers 7A to 7C decreases. When the floating amount increases, the bare fiber B may come off the non-contact direction changers 7A to 7C, resulting in fiber breaking. On the other hand, when the floating amount decreases, the non-contact direction changers 7A to 7C and the bare fiber B may come into contact with each other, resulting in fiber breaking.

Therefore, the outer diameter of the bare fiber B is measured by the fiber diameter measuring unit 4 disposed on the upstream side of the non-contact direction changers 7A to 7C, and the flow rate of the gas is adjusted by the gas amount adjusting unit 16 so as to stabilize the floating amount of the bare fiber B in the non-contact direction changers 7A to 7C. When the flow rate of the gas changes, the amount of heat taken from the bare fiber B by the gas is changed. Thus, the temperature of the bare fiber B entering the coating units 9A and 9B changes.

(2) Change in Tension of Bare Fiber B

Normally, the electric power supplied to the melting furnace 3 and the feed speed of the preform M to the melting furnace 3 are adjusted such that the tension applied to the bare fiber B is as stable as possible. However, due to the variation in the outer diameter of the preform M in the longitudinal direction and the reduction in the volume of the preform M due to the drawing, tension adjustment based on electric power and feed speed may not be made in time. As a result, the tension applied to the bare fiber B may change.

The tension applied to the bare fiber B acts as a force that resists the wind pressure of the gas in the non-contact direction changers 7A to 7C. Therefore, when the tension decreases, the floating amount of the bare fiber B in the non-contact direction changers 7A to 7C increases. On the contrary, when the tension increases, the floating amount of the bare fiber B in the non-contact direction changers 7A to 7C decreases. As described in (1), when the flow rate of the gas is adjusted so as to stabilize the floating amount, the temperature of the bare fiber B entering the coating units 9A and 9B changes.

(3) Change in the Entry Position of the Bare Fiber B into the Non-Contact Direction Changer 7A The non-contact direction changer 7A is disposed such that the position where the bare fiber B exits from the melting furnace 3 and the desired floating position of the bare fiber B in the non-contact direction changer 7A coincide with each other. The position where the bare fiber B exits from the melting furnace 3 is determined by the position of the heater portion of the melting furnace 3 on the orthogonal plane and the position of the preform M with respect to the heater portion on the orthogonal plane. Then, the preform M is installed such that the center of the preform M coincides with the center of the heater portion of the melting furnace 3.

However, the center position of the preform M with respect to the center of the heater may change due to the bending of the preform M itself in the longitudinal direction, or the slight inclination of the preform M occurred when the preform M is installed, and the like. As a result, the position where the bare fiber B exits from the melting furnace 3 may change. When the position of the bare fiber B changes, the apparent floating amount of the bare fiber B with respect to the non-contact direction changer 7A changes. Therefore, the flow rate of the gas is adjusted by the gas amount adjusting unit 16 so as to stabilize the floating amount. As described in (1), when the flow rate of the gas is adjusted so as to stabilize the floating amount, the temperature of the bare fiber B entering the coating units 9A and 9B changes.

When the temperature of the bare fiber B entering the coating units 9A and 9B changes due to the phenomena (1) to (3) described above, the state of the resin material applied to the outer circumference of the bare fiber B changes. That is, the thickness of the coating varies, and the adhesion between the coating and the bare fiber B deviates from the appropriate range.

Therefore, in one or more embodiments, control is performed so as to suppress the change in the flow rate of the gas of the non-contact direction changer 7A and stabilize the state of coating. As an outline of the control, the factors that change the flow rate of the gas of the non-contact direction changer 7A are acquired, and the position of the bare fiber B entering the non-contact direction changer 7A is adjusted from the result. In the first embodiment, control particularly focusing on the above-described phenomenon (1) is performed. Hereinafter, a more detailed description will be given.

As shown in FIG. 1, the manufacturing apparatus 1A of one or more embodiments includes a fiber diameter measuring unit 4 disposed between the melting furnace 3 and the non-contact direction changer 7A in order to measure the change in the outer diameter of the bare fiber B. Further, since the bubbles in the bare fiber B cause a change in the outer diameter, a bubble detection unit 5 installed between the melting furnace 3 and the non-contact direction changer 7A is provided. Further, a position detection unit 6 that detects the position of the bare fiber B is provided on the upstream side of the non-contact direction changer 7A.

The grip unit 2 that grips the preform M is provided with an alignment mechanism that adjusts the position of the preform M in an orthogonal plane. As shown in FIG. 1, the fiber diameter measuring unit 4, the bubble detection unit 5, and the position detection unit 6 are connected to the control unit 15. Further, the control unit 15 is configured to perform feedback control on the alignment mechanism of the grip unit 2, based on the detection results of the fiber diameter measuring unit 4, the bubble detection unit 5, and the position detection unit 6.

Figure 2:
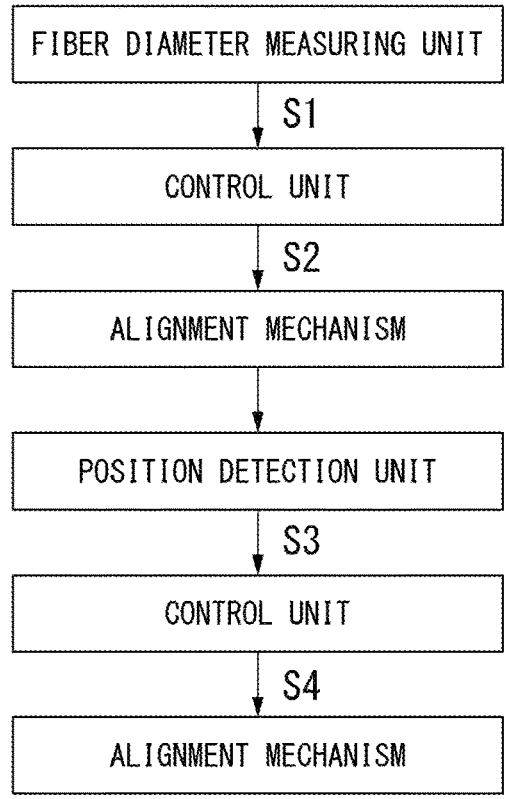
FIG. 2 is a diagram showing a control flow of the optical fiber manufacturing apparatus of the first embodiment.

An example of feedback control is shown in FIG. 2. First, the factors that change the flow rate of the gas blown to the bare fiber B in the cooling unit are acquired as the input information 51 and the input information 51 is input to the control unit 15. In one or more embodiments, the measurement result of the fiber diameter by the fiber diameter measuring unit 4 is input to the control unit 15 as the input information 51. The control unit 15 determines whether or not a change in the fiber diameter has occurred, based on the input information 51. When the control unit 15 determines that the fiber diameter has changed, the control unit 15 outputs an alignment command S2 according to the result of the determination, to the alignment mechanism of the grip unit 2.

For example, when the fiber diameter becomes large, the floating amount of the bare fiber B in the non-contact direction changer 7A increases. To cancel this, the control unit 15 moves the preform M in the direction of bringing the bare fiber B closer to the non-contact direction changer 7A (alignment command S2). On the contrary, when the fiber diameter becomes small, the control unit 15 moves the preform M in the direction of moving the bare fiber B away from the non-contact direction changer 7A (alignment command S2).

By moving the preform M, the position of the bare fiber B in the position detection unit 6 changes. The position detection unit 6 inputs the position information S3 regarding the position of the bare fiber B with respect to the non-contact direction changer 7A, to the control unit 15. Based on the position information S3, the control unit 15 determines whether or not the bare fiber B is in a desired position with respect to the non-contact direction changer 7A. When the bare fiber B reaches a desired position, the control unit 15 outputs a movement stop command S4 of the preform M, to the alignment mechanism of the grip unit 2. Thus, the position of the bare fiber B with respect to the non-contact direction changer 7A is stabilized, so that the change in the flow rate of the gas of the non-contact direction changer 7A is suppressed.

As described above, the method for manufacturing an optical fiber of one or more embodiments includes: gripping a preform M by a grip unit 2 having an alignment mechanism; forming a bare fiber B by melting the preform M in a melting furnace 3; cooling the bare fiber B by blowing gas by a cooling unit (the non-contact direction changer 7A); applying a resin to be a coating to an outer circumference of the bare fiber B; curing the resin; acquiring a factor that changes a flow rate of the gas blown to the bare fiber B in the cooling unit, as input information 51; and adjusting an entry position of the bare fiber B into the cooling unit, by controlling the alignment mechanism and moving the preform, based on the input information 51. With this configuration, it is possible to adjust the entry position of the bare fiber B with respect to the cooling unit so as to suppress the change in the flow rate of the gas. Therefore, the temperature change of the bare fiber B due to the change in the flow rate of the gas in the cooling unit is suppressed, and it is possible to stabilize the state of the coating.

Further, in one or more embodiments, the non-contact direction changer 7A is used as the cooling unit. Thus, it is possible to increase the length of the path line of the manufacturing apparatus 1A without increasing the size of the building that houses the manufacturing apparatus 1A.

Further, in one or more embodiments, as the input information 51, the outer diameter of the bare fiber B measured by the fiber diameter measuring unit 4 installed between the melting furnace 3 and the non-contact direction changer 7A is used. According to this configuration, it is possible to suppress the change in the flow rate of the gas of the non-contact direction changer 7A caused by the change in the outer diameter of the bare fiber B, and the state of the coating can be stabilized.

Figure 3:
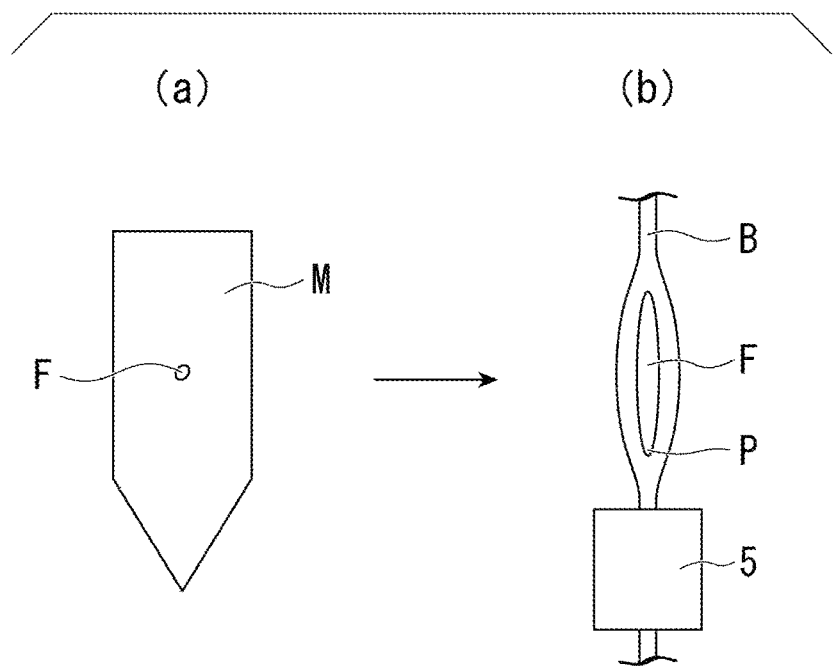
FIG. 3 shows a preform containing a bubble in part (a), and shows a bare fiber formed by drawing the preform of part (a) in part (b).

Further, for example, as shown in part (a) of FIG. 3, when the preform M contains the bubble F, the bare fiber B formed by drawing the preform M also contains the bubble F. As shown in part (b) of FIG. 3, since the bare fiber B is stretched in the longitudinal direction during drawing, the bubble F in the bare fiber B has a substantially spindle shape. Then, the outer diameter of the bare fiber B also changes in the longitudinal direction, according to the shape of the bubble F. When the bubble detection unit 5 detects the presence of the bubble F at the end portion P on the downstream side of the bubble F, it may be predicted that the outer diameter of the bare fiber B gradually increases from the position where the end portion P is detected toward the upstream side.

Therefore, when the control unit 15 detects the presence of the bubbles F, the control unit 15 may move the preform M in the direction of bringing the bare fiber B closer to the non-contact direction changer 7A. That is, the presence or absence of bubbles in the bare fiber B, detected by the bubble detection unit 5 installed between the melting furnace 3 and the non-contact direction changer 7A may be used as the input information 51. Since the control according to the detection result of the bubble detection unit 5 is based on the prediction, it is possible to further improve the responsiveness of the feedback control.

Second Embodiment

Next, a second embodiment according to the present invention will be described, but the basic configuration is the same as that of the first embodiment. Therefore, the same reference numerals are given to similar components, the explanation thereof will be omitted, and only difference will be described.

In one or more embodiments, control focusing on the above-described phenomenon (2) is performed.

Figure 4:
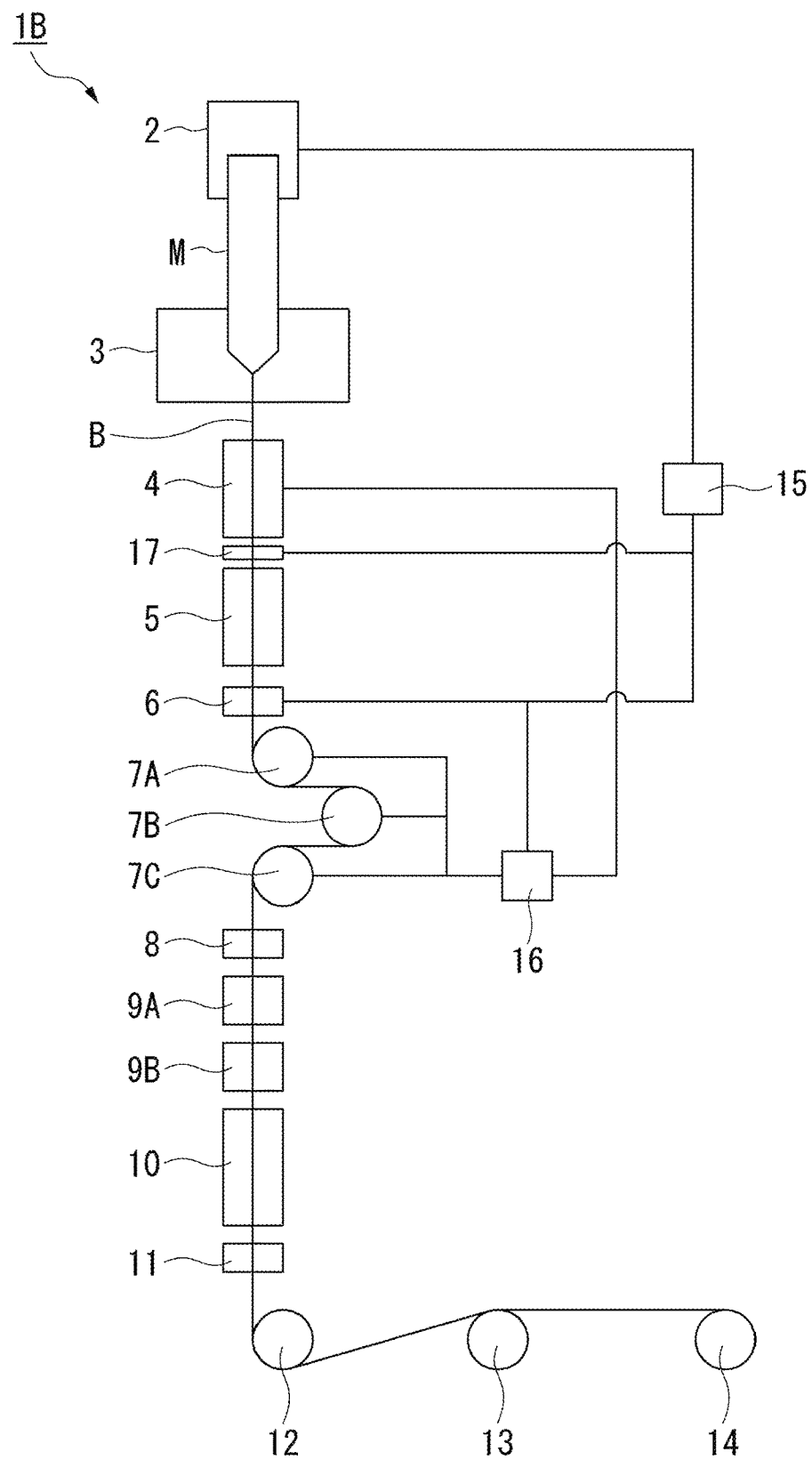
FIG. 4 is a diagram showing a schematic configuration of an optical fiber manufacturing apparatus according to a second embodiment.

As shown in FIG. 4, a manufacturing apparatus 1B in the second embodiment includes a tension measuring unit 17 (i.e., tension measure) that measures the tension applied to the bare fiber B. The tension measuring unit 17 is located on the downstream side of the melting furnace 3 and on the upstream side of the non-contact direction changer 7A. If it is possible to measure the tension of the bare fiber B entering the non-contact direction changer 7A, the position of the tension measuring unit 17 may be changed as appropriate. As the tension measuring unit 17, for example, a non-contact type tension meter may be used. The tension measuring unit 17 is connected to the control unit 15 by wire or wirelessly.

In one or more embodiments, the tension value of the bare fiber B measured by the tension measuring unit 17 is used as the input information 51. The tension measuring unit 17 inputs the tension value as the input information 51 to the control unit 15. The control unit 15 determines whether or not a change in the tension of the bare fiber B has occurred, based on the input information 51. When the control unit 15 determines that a change in tension has occurred, the control unit 15 outputs an alignment command S2 according to the result of the determination, to the alignment mechanism of the grip unit 2.

For example, when the tension becomes small, the floating amount of the bare fiber B in the non-contact direction changer 7A increases. To cancel this, the control unit 15 moves the preform M in the direction of bringing the bare fiber B closer to the non-contact direction changer 7A (alignment command S2). On the contrary, when the tension becomes large, the control unit 15 moves the preform M in the direction of moving the bare fiber B away from the non-contact direction changer 7A (alignment command S2).

The details of the subsequent control will be omitted because they are the same as those in the first embodiment. As described above, even when the tension value of the bare fiber B measured by the tension measuring unit 17 installed between the melting furnace 3 and the non-contact direction changer 7A is used as the input information 51, it is possible to stabilize the state of the coating.

Third Embodiment

Next, a second embodiment according to the present invention will be described, but the basic configuration is the same as that of the first embodiment. Therefore, the same reference numerals are given to similar components, the explanation thereof will be omitted, and only difference will be described.

In the third embodiment, control focusing on the above-described phenomenon (3) is performed.

In the third embodiment, substantially the same manufacturing apparatus 1A (FIG. 1) as in the first embodiment is used. However, in one or more embodiments, the position of the bare fiber B on the orthogonal plane, detected by the position detection unit 6, is used as the input information 51. The position detection unit 6 may be disposed between the melting furnace 3 and the non-contact direction changer 7A, but may further be closer to the non-contact direction changer 7A. The position detection unit 6 inputs the position of the bare fiber B as the input information 51 to the control unit 15. Based on the input information 51, the control unit 15 determines whether or not the position of the bare fiber B has changed with respect to the non-contact direction changer 7A. When the control unit 15 determines that the position of the bare fiber B has changed with respect to the non-contact direction changer 7A, the control unit 15 outputs an alignment command S2 according to the result of the determination, to the alignment mechanism of the grip unit 2.

For example, when the position of the bare fiber B with respect to the non-contact direction changer 7A becomes close, the preform M is moved in the direction of moving the bare fiber B away from the non-contact direction changer 7A (alignment command S2). On the contrary, when the position of the bare fiber B with respect to the non-contact direction changer 7A becomes far, the preform M is moved in the direction of bringing the bare fiber B closer to the non-contact direction changer 7A (alignment command S2).

The details of the subsequent control will be omitted because they are the same as those in the first embodiment. As described above, even when the position of the bare fiber B with respect to the non-contact direction changer 7A installed between the melting furnace 3 and the non-contact direction changer 7A is used as the input information 51, the state of the coating can be stabilized.

Fourth Embodiment

Next, a fourth embodiment according to the present invention will be described, but the basic configuration is the same as that of the first embodiment. Therefore, the same reference numerals are given to similar components, the explanation thereof will be omitted, and only difference will be described.

In the fourth embodiment, control focusing on the above-described phenomenon (3) is performed.

Figure 5:
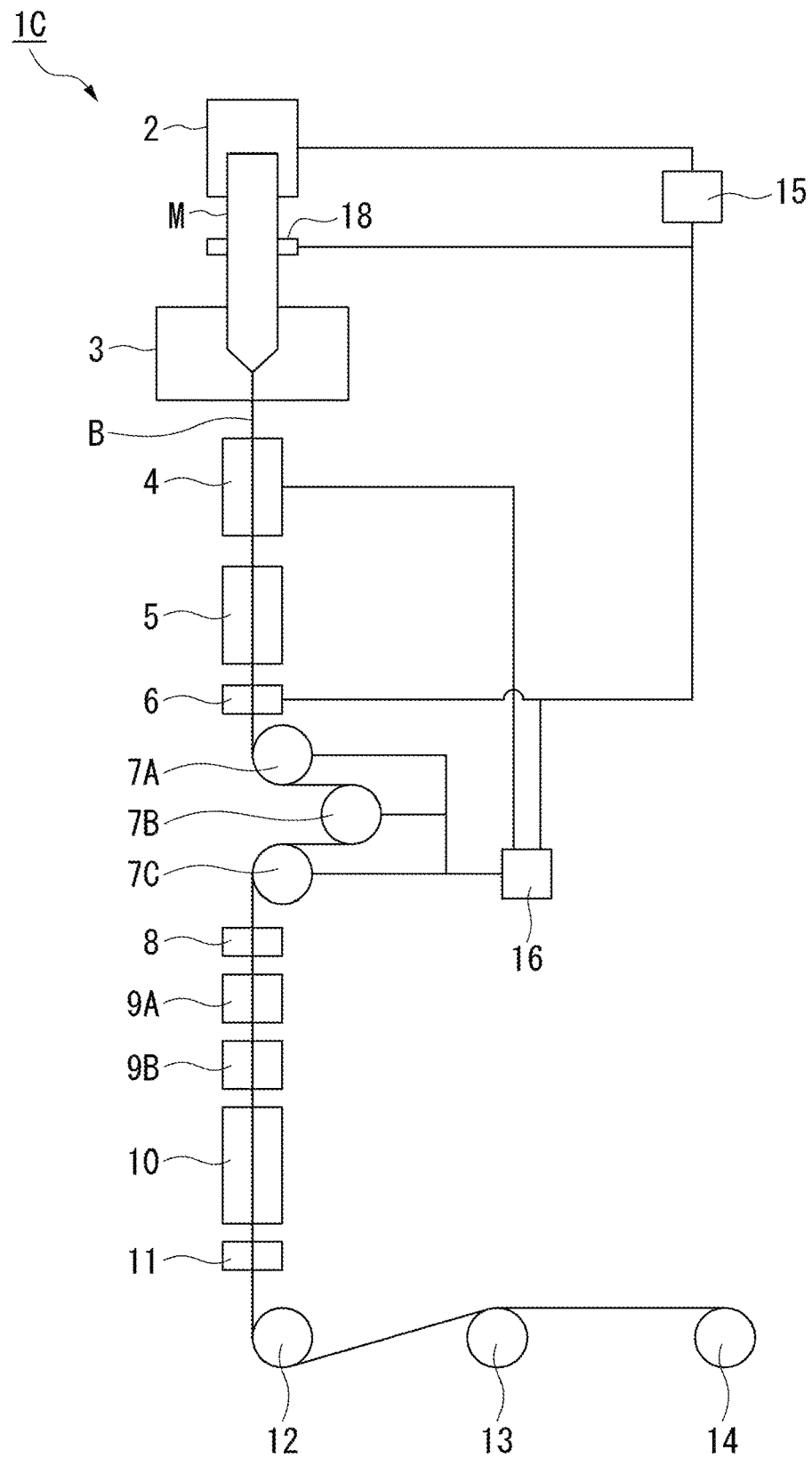
FIG. 5 is a diagram showing a schematic configuration of an optical fiber manufacturing apparatus according to a fourth embodiment.

As shown in FIG. 5, a manufacturing apparatus 1C according to the fourth embodiment includes a preform position measuring unit 18 (i.e., preform position measure) that measures the position of the preform M in an orthogonal plane. The preform position measuring unit 18 is disposed further upstream than the melting furnace 3. The preform position measuring unit 18 is connected to the control unit 15 by wire or wirelessly.

The preform position measuring unit 18 measures the amount of deviation between the center position of the preform M and the center of the heater of the melting furnace 3 (i.e., the origin of coordinates). The deviation is caused by the bending of the preform M itself in the longitudinal direction or the slight inclination of the installation posture of the preform M. The preform position measuring unit 18 inputs the deviation amount and the deviation direction to the control unit 15 as input information 51. The control unit 15 outputs an alignment command S2 based on the input information 51, to the alignment mechanism of the grip unit 2.

For example, when the position of the preform M deviates from the origin of coordinates in the direction of bringing the bare fiber B closer to the non-contact direction changer 7A, the preform M is moved in the opposite direction (alignment command S2). For example, when the position of the preform M deviates from the origin of coordinates in the direction in which the bare fiber B moves away from the non-contact direction changer 7A, the preform M is moved in the opposite direction (alignment command S2).

The details of the subsequent control will be omitted because they are the same as those in the first embodiment. As described above, even when the position of the preform M measured by the preform position measuring unit 18 installed on the upstream side of the melting furnace 3 is used as the input information 51, it is possible to stabilize the state of the coating.

EXAMPLES

Hereinafter, the above embodiments will be described with reference to specific examples. The present invention is not limited to the examples below.

Example 1

The drawing is performed in the manufacturing apparatus 1A shown in FIG. 1. A commercially available outer diameter measuring instrument is used as the fiber diameter measuring unit 4. As the position detection unit 6, a non-contact position sensor is installed immediately before the non-contact direction changer 7A. The feedback control shown in FIG. 2 is performed using the diameter of the bare fiber B measured by the fiber diameter measuring unit 4 as the input information 51. The target outer diameter of the bare fiber B is 125 µm, and the target outer diameter of the coating is 250 µm. An ultraviolet curable resin (urethane acrylate) is used as the coating material. When the drawing speed is 50 m/sec, the outer diameter of the coating is stable at 250±1 µm.

In order to check the effect of feedback control, the outer diameter of the bare fiber B is intentionally changed to 125±1 µm. Even in the portion where the outer diameter of the bare fiber B is changed in this way, the outer diameter of the coating is stable at 250±1.5 µm. The reason why the change in the outer diameter of the coating is large is that the change in the outer diameter of the bare fiber B has changed the outer diameter of the coating, accordingly.

Example 2

The drawing is performed in the manufacturing apparatus 1B shown in FIG. 4. A commercially available non-contact tension measuring meter is used as the tension measuring unit 17. As the input information 51, the tension measurement result by the tension measuring unit 17 is used. Other conditions are the same as in Example 1.

In order to check the effect, the tension applied to the bare fiber B is intentionally changed in the range of ±20 gf. The outer diameter of the coating is stable at 250±1 µm even in the portion drawn by changing the tension in this way.

Example 3

The drawing is performed in the manufacturing apparatus 1C shown in FIG. 5. As the input information 51, the amount of deviation and the direction of deviation of the preform M from the origin of coordinates are used. Other conditions are the same as in Example 1.

In order to check the effect of the feedback control, the preform M is gripped by the grip unit 2 in a state of being intentionally inclined from the ideal posture. The amount of inclination is such that the coordinates on the orthogonal plane deviate by about 3 mm between the center position of the lower end portion and the center position of the upper end portion of the preform M. As a result of drawing the preform M from the lower end portion to the upper end portion of the preform M, the outer diameter of the coating is stable at 250±1 µm over the entire length.

Comparative Example 1

In the configuration of Example 1, the outer diameter of the bare fiber B is intentionally changed to ±1 µm as in Example 1 without performing feedback control. In the portion where the outer diameter of the bare fiber B is changed in this way, the outer diameter of the coating is changed in the range of 250±5 µm. As described above, as a result of not performing feedback control, the greater change in the outer diameter of the coating occurred than expected by the change in the outer diameter of the bare fiber B. Conversely, it is checked that the feedback control in Example 1 makes it possible to suppress the change in the outer diameter of the coating due to the change in the outer diameter of the bare fiber B.

Comparative Example 2

In the configuration of Example 2, the tension applied to the bare fiber B is intentionally changed in the range of ±20 gf in the same manner as in Example 2 without performing feedback control. In the portion where the tension is changed, the outer diameter of the coating has changed in the range of 250±5 µm. As described above, it is confirmed that the feedback control in Example 2 makes it possible to suppress the change in the outer diameter of the coating due to the change in tension.

Comparative Example 3

In the configuration of Example 3, the preform M is intentionally inclined and gripped in the same manner as in Example 3, without performing feedback control. As a result of drawing the preform M from the lower end portion to the upper end portion of the preform M, the outer diameter of the coating changes in the range of 250±5 µm over the entire length. As described above, it is checked that the feedback control in Example 3 makes it possible to suppress the change in the outer diameter of the coating due to the inclination of the preform M.

It should be noted that the technical scope of the present invention is not limited to the above-described embodiments, and various modifications can be made without departing from the spirit of the present invention.

For example, in the first to fourth embodiments, the cooling unit is a non-contact direction changer, and has not only a function of cooling the bare fiber B but also a function of changing the direction of the bare fiber B. However, the cooling unit may not be a non-contact direction changer, and may be a portion that simply cools the bare fiber B with air.

In addition, without departing from the spirit of the present invention, it is possible to appropriately replace the constituent elements in the above-described embodiments with well-known constituent elements, and the above-described embodiments and modification examples may be appropriately combined.

For example, the control methods of the first to fourth embodiments may be combined. In this case, the input information 51 is a combination of two or more of the outer diameter of the bare fiber B, the presence or absence of bubbles in the bare fiber B, the tension of the bare fiber B, the position of the bare fiber B with respect to the cooling unit (non-contact direction changer 7A), and the position of the preform M. Further, a relational expression to show how each input information 51 influences the gas flow rate of the non-contact direction changer 7A may be prepared. Then, the control unit 15 may control the alignment mechanism based on the relational expression to adjust the entry position of the bare fiber B into the cooling unit.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1A to 1C: Manufacturing apparatus
2: Grip unit
3: Melting furnace
4: Fiber diameter measuring unit
5: Bubble detection unit
6: Position detection unit
7A to 7C: Non-contact direction changer
9A, 9B: Coating unit
10: Coating curing device
17: Tension measuring unit
18: Preform position measuring unit
B: Bare fiber
M: Preform

What is claimed is:
1. A method for manufacturing an optical fiber, comprising:
gripping a preform by a gripper that comprises an aligner;
forming a bare fiber by melting the preform in a melting furnace;
cooling the bare fiber by blowing gas in a cooler;

applying resin to an outer circumference of the bare fiber;
curing the resin;
acquiring input information on one or more factors that change a flow rate of the gas blown to the bare fiber in the cooler; and
adjusting, based on the input information, an entry position of the bare fiber into the cooler by controlling the aligner and moving the preform.

2. The method according to claim 1, wherein the cooler is a non-contact direction changer.

3. The method according to claim 2, wherein the non-contact direction changer has a guide groove that:
guides the bare fiber, and
comprises an outlet for the gas that floats the bare fiber wound along the guide groove.

4. The method according to claim 1, wherein the input information is an outer diameter of the bare fiber measured by a fiber diameter measure disposed between the melting furnace and the cooler.

5. The method according to claim 1, wherein the input information is presence or absence of a bubble in the bare fiber detected by a bubble detector disposed between the melting furnace and the cooler.

6. The method according to claim 1, wherein the input information is tension of the bare fiber measured by a tension measure disposed between the melting furnace and the cooler.

7. The method according to claim 1, wherein the input information is a position of the bare fiber with respect to the cooler detected by a position detector disposed between the melting furnace and the cooler.

8. The method according to claim 1, wherein the input information is a position of the preform measured by a preform position measure disposed on an upstream side of the melting furnace.

9. The method according to claim 1, wherein the aligner moves the preform.

* * * * *